United States Patent [19]
Takizawa et al.

[11] Patent Number: 6,097,737
[45] Date of Patent: Aug. 1, 2000

[54] METHOD AND APPARATUS FOR CONTROL OF CARRIER FREQUENCY AND MODULATION AND FOR QUANTIZING BLOCK DATA

[75] Inventors: Hiroshi Takizawa; Akihiro Shikakura; Yushi Kaneko, all of Utsunomiya, Japan

[73] Assignee: Canon Kabushiki Kaisha, Tokyo, Japan

[21] Appl. No.: 08/854,072

[22] Filed: May 9, 1997

[30] Foreign Application Priority Data

May 14, 1996 [JP] Japan .................................. 8-118937

[51] Int. Cl.[7] ............................................ H04J 1/00
[52] U.S. Cl. .......................... 370/484; 370/480; 370/487
[58] Field of Search .................................. 370/319, 480, 370/481, 482, 485, 486, 484, 487; 348/405, 423

[56] References Cited

U.S. PATENT DOCUMENTS

| | | | |
|---|---|---|---|
| 4,688,100 | 8/1987 | Haganuma et al. | 358/261.1 |
| 5,070,503 | 12/1991 | Shikakura | 714/776 |
| 5,212,695 | 5/1993 | Shikakura et al. | 714/759 |
| 5,559,557 | 9/1996 | Kato | 348/405 |
| 5,583,562 | 12/1996 | Birch et al. | 348/12 |
| 5,671,226 | 9/1997 | Murakami et al. | 370/474 |
| 5,721,791 | 2/1998 | Maeda et al. | 382/253 |
| 5,898,799 | 4/1999 | Murayama | 382/242 |

*Primary Examiner*—Hassan Kizou
*Assistant Examiner*—Mitchell Slavitt
*Attorney, Agent, or Firm*—Fitzpatrick, Cella, Harper & Scinto

[57] ABSTRACT

An information processing method an apparatus are described in which several items of information to be transmitted efficiently within a given frequency band to different receivers. The items of information are multiplexed and used to modulate a carrier whose central frequency is set according to the number of items of information that are multiplexed.

17 Claims, 8 Drawing Sheets

| 2109 | 1619 | 2739 | 1840 | 409 | 300 | 282 |
|------|------|------|------|-----|-----|-----|
| 1245 | 1543 | 1539 | 504  | 320 | 31  | 265 |
| 1398 | 1890 | 1640 | 469  | 28  | 25  | 278 |
| 1098 | 1875 | 389  | 323  | 27  | 31  | 30  |
| 1889 | 1089 | 359  | 31   | 30  | 23  | 23  |
| 1749 | 1500 | 309  | 29   | 25  | 24  | 19  |

| 3 | 3 | 3 | 2 | 0 | 0 | 0 |
|---|---|---|---|---|---|---|
| 3 | 3 | 3 | 2 | 2 | 0 | 0 |
| 3 | 3 | 3 | 2 | 2 | 0 | 0 |
| 3 | 2 | 2 | 2 | 0 | 0 | 0 |
| 3 | 3 | 2 | 2 | 0 | 0 | 0 |
| 3 | 2 | 2 | 0 | 0 | 0 | 0 |
| 3 | 2 | 2 | 2 | 0 | 0 | 0 |

*Bn*

CLASS:3 CLASS:2 CLASS:0

FIG.6(b)

| 3 | 3 | 2 | 2 | 1 | 1 | 1 |
|---|---|---|---|---|---|---|
| 3 | 3 | 2 | 2 | 1 | 1 | 0 |
| 3 | 2 | 2 | 1 | 1 | 0 | 0 |
| 3 | 2 | 2 | 1 | 1 | 0 | 0 |
| 3 | 2 | 1 | 1 | 0 | 0 | 0 |
| 3 | 2 | 1 | 0 | 0 | 0 | 0 |
| 3 | 2 | 1 | 0 | 0 | 0 | 0 |

*Bn*

CLASS:3 CLASS:2 CLASS:1 CLASS:0

FIG.6(c)

METHOD AND APPARATUS FOR CONTROL OF CARRIER FREQUENCY AND MODULATION AND FOR QUANTIZING BLOCK DATA

BACKGROUND OF THE INVENTION

1. Field of the Invention

This invention relates to an information data processing apparatus for transmitting information data, such as image data or the like, and to an encoding apparatus for encoding the information data.

2. Description of the Related Art

Digital SNG (satellite news gathering) is known as a typical method for transmitting a digital image to a remote location. In the digital SNG, by controlling the amount of generated information in accordance with a preset necessary picture-quality mode and generating a plurality of carriers in a single transponder, a plurality of stations can be simultaneously operated.

A description will now be provided of a conventional digital SNG transmission method.

FIG. 1 is a block diagram illustrating a conventional digital SNG transmission unit.

In FIG. 1, a digital image signal input via an input terminal 71 is subjected to data compression by an image-data encoding unit 72 according to an encoding method such as represented by MPEG (Moving Picture Experts Group) 2. A header, an error-correcting code and the like are added to the signal subjected to data compression by a multiplexing unit 73, and the resultant signal is transmitted to a modulation unit 74.

The output rate at this stage differs depending on which preset mode has been selected from among three modes. For example, the information rate is high in a high picture quality (HQ) mode in which high quality is required for the material of the program. The information rate is rather low in a standard picture quality (NQ) mode in which it is only necessary to understand the contents of news. The information rate is further compressed to a low value in a mode in which high picture quality is not required, such as a secondary distribution picture quality (SQ) mode.

The modulation unit 74 performs digital modulation of a carrier by the input data. The modulated wave is subjected to frequency conversion into a predetermined frequency by a frequency conversion unit 75, and is then amplified by a high-frequency amplification unit 76, and the amplified signal is output from an antenna 77. In order to effectively use a transponder, the output frequency is set to a different frequency depending on the mode.

This operation will be described with reference to FIG. 2.

FIG. 2 is a diagram illustrating the arrangement of the frequencies of transmission signals.

In the digital SNG transmission unit having the high picture quality mode, the standard picture quality mode and the secondary distribution picture quality mode, the central frequency when transmitting a signal in the high picture quality mode is F3, and a frequency F1 is selected as the central frequency for the secondary distribution picture quality mode. The central frequency when transmitting the signal in the standard picture quality mode is selected from among F2, F4 and F5 depending on the state of the use of bands by other stations.

As described above, in order to effectively use bands, it is necessary to optimize the relationship between the occupied bandwidth and the central frequency of the carrier in each mode.

In the above-described digital SNG system, the central frequencies of carriers are set so that images for respective programs having different picture quality levels can be effectively transmitted. However, since the frequencies are not arranged symmetrically with respect to the central frequency F0 of the band allocated for images, if one wave is output within the band, the degree of freedom of the transmission frequencies of other stations is greatly restricted.

In a conventional image data encoding method, image data is divided into a plurality of blocks, and encoding is performed for each of the blocks. The amount of codes obtained as a result of encoding greatly differs depending on the contents of the image. Hence, in order to obtain a constant transmission rate, processing for maintaining the transmission rate at a constant value, in which encoded image data is stored in a buffer memory and the quantization coefficient is changed using the degree of occupation of the buffer memory, is performed.

Accordingly, in the conventional encoding method, even when a block having a high-frequency component in the contents of the image is adjacent to a block having a low-frequency component in the contents of the image, the same level of quantization is performed. As a result, encoding noise which is hardly recognizable in the block having the high-frequency component is clearly observed in the block having the low-frequency component, thereby degrading the quality of the image.

SUMMARY OF THE INVENTION

The present invention has been made in consideration of the above-described problems.

It is an object of the present invention to provide an information data transmission system in which, when transmitting digital information data using the same allocated band by a plurality of stations, any restriction on frequencies given to other stations is minimized to provide an excellent utilization efficiency of the band.

According to one aspect, the present invention which achieves the above-described object relates to an information data processing apparatus including an input unit for inputting a plurality of information data, a multiplexing unit for multiplexing the plurality of information data input by the input unit, a modulation unit for performing digital modulation of a carrier using the information data multiplexed by the multiplexing unit, and a setting unit for setting a central frequency of the carrier in accordance with the number of information data multiplexed by the multiplexing unit.

According to another aspect, the present invention which achieves the above-described object relates to an information data processing apparatus for performing digital transmission of a plurality of encoded image data within a predetermined transmission band W, including a plurality of encoding units for encoding a plurality of image data, and a multiplexing unit for multiplexing the plurality of image data encoded by the plurality of encoding units and outputting the resultant data. The multiplexed data is data having a bit rate equal to K ($1 \leq K \leq L$: integer) times a bit rate R of multiplexed data which can be transmitted within a band W/L determined by a predetermined maximum number L of carriers within the predetermined transmission band. The apparatus also includes a modulation unit for performing digital modulation of the carrier using the multiplexed data. An output rate of the encoding unit can be set within a range of 1/L–L times the bit rate R.

According to still another aspect, the present invention which achieves the above-described object relates to an information data processing method including the steps of inputting a plurality of information data, multiplexing the plurality of input information data, performing digital modulation of a carrier using the multiplexed information data, and setting a central frequency of the carrier in accordance with the number of multiplexed information data.

It is another object of the present invention to provide an encoding apparatus which performs quantization that is appropriate, with respect to visual characteristics, for image data and which can obtain excellent image quality.

According to yet another aspect, the present invention which achieves the above-described object relates to an encoding apparatus including an input unit for inputting image data, a block forming unit for dividing the image data into blocks, an extraction unit for extracting a feature of image data for each of the blocks formed by the block forming unit, a quantization unit for quantizing image data of a target block in accordance with a result of extraction of the extraction unit and blocks adjacent to the target block, and an encoding unit for encoding the image data quantized by the quantization unit.

According to yet a further aspect, the present invention which achieves the above-described object relates to an encoding method including the steps of inputting image data, dividing the image data into blocks, extracting a feature of image data for each of the blocks, quantizing image data of a target block in accordance with a result of extraction in the extracting step and blocks adjacent to the target block, and encoding the quantized image data.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 6 is a diagram illustrating class numbers in a process of generating quantization auxiliary parameters in the first embodiment;

DETAILED DESCRIPTION OF THE PREFERRED EMBODIMENTS

Preferred embodiments of the present invention will now be described.

First Embodiment

Figure 1:
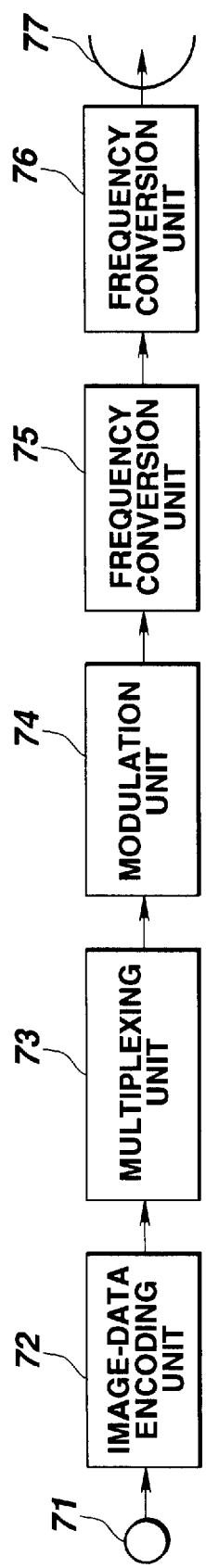
FIG. 1 is a block diagram illustrating the configuration of a conventional digital SNG transmission unit.
Figure 2:
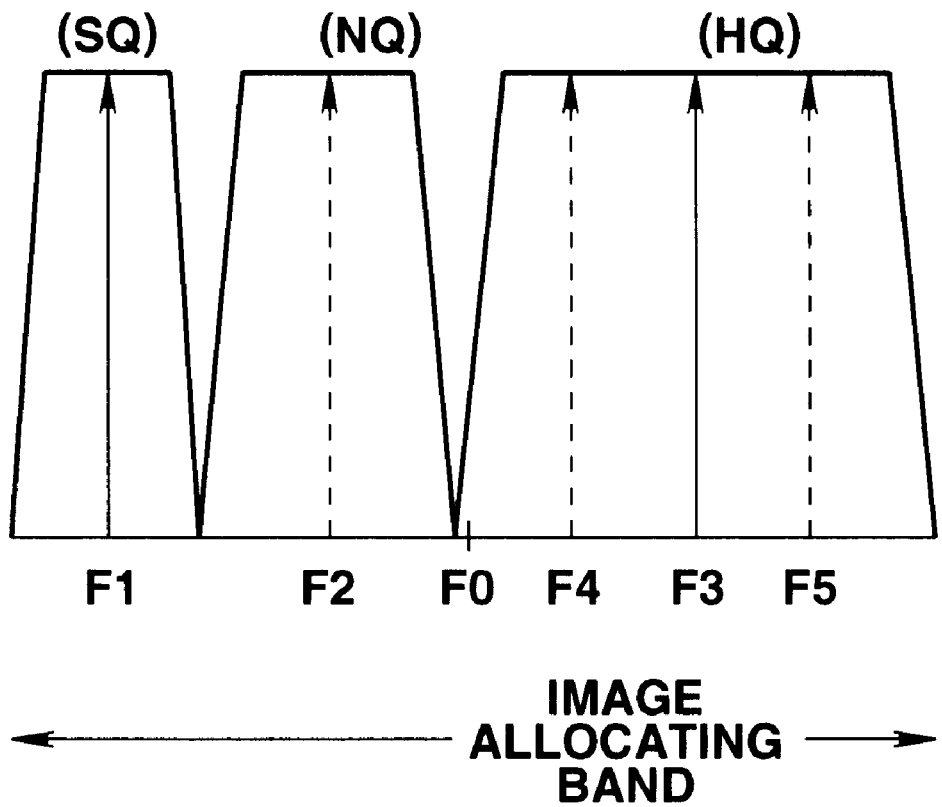
FIG. 2 is a diagram illustrating the arrangement of the frequencies of transmission signals in conventional digital SNG.
Figure 3:
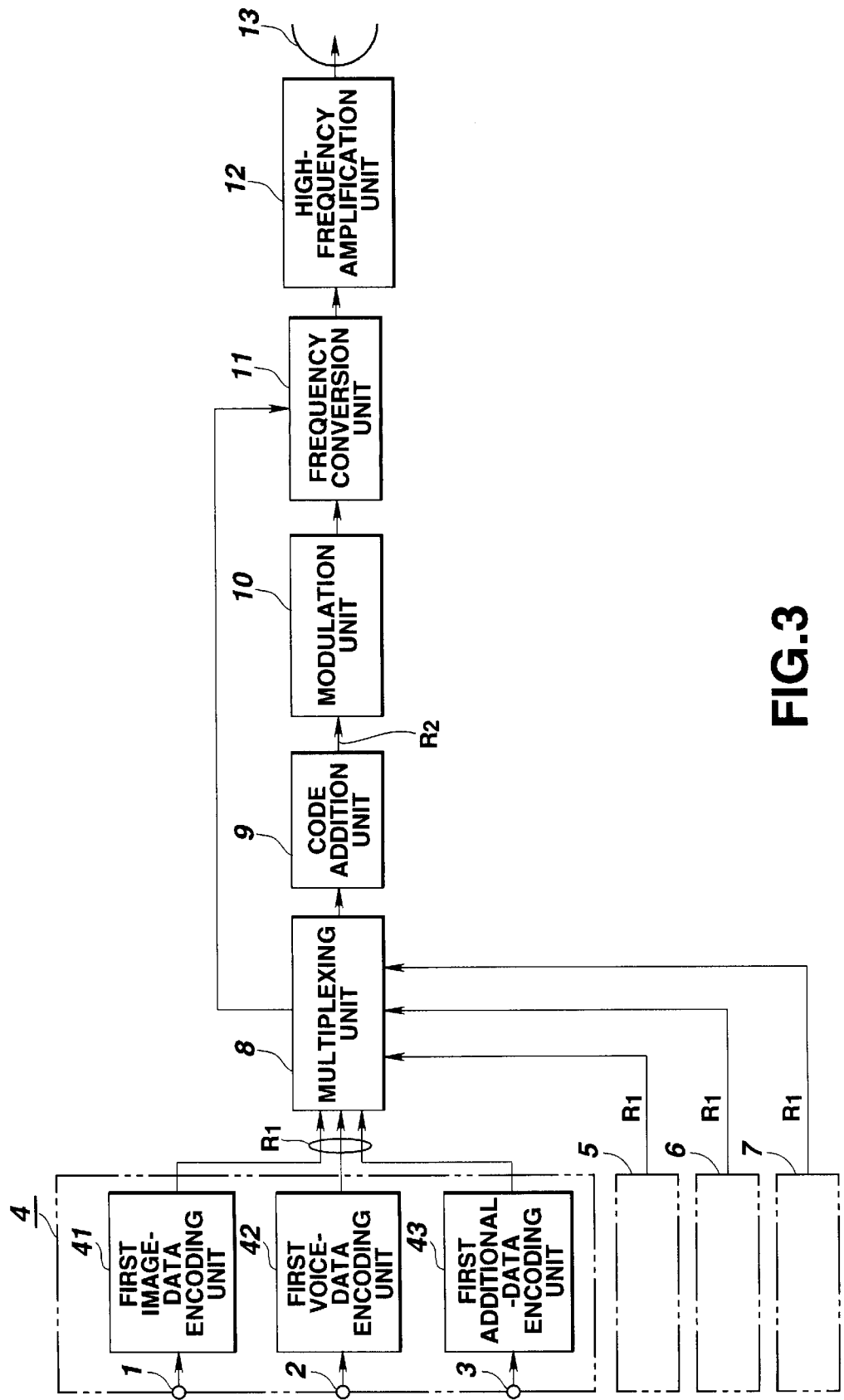
FIG. 3 is a block diagram illustrating the configuration of an image data transmission apparatus according to a first embodiment of the present invention.

FIG. 3 is a block diagram illustrating the configuration of an image-data transmission apparatus according to a first embodiment of the present invention.

In the first embodiment, the maximum number L of carriers within a band is set to 4, and a case of transmitting at most four complex data are transmitted is considered.

In FIG. 3, digital image data input to a first image-input terminal is transmitted to a first image-data encoding unit 41. Digital voice data input to a first voice-input terminal 2 is transmitted to a first voice-data encoding unit 42. Additional data input to a first additional-data input terminal 3 is transmitted to a first additional-data encoding unit 43.

The data encoding units 41, 42 and 43 constitute a first composite-data encoding unit 4. Second, third and fourth composite-data encoding units 5, 6 and 7, respectively, have the same internal configuration as the first composite-data encoding unit 4.

Each of the input data is compressed by the corresponding data encoding unit into a rate $R_1$ determined from a predetermined transmission band W, and is transmitted to a multiplexing unit 8. The multiplexing unit 8 performs multiplexing of encoded data from the respective data encoding units and outputs the resultant data. Although the output rate differs depending on a preset number of multiplexed composite data, each rate is an integer multiple of the rate $R_1$ for unit composite data.

For example, in the cases of two multiplexed composite data, three multiplexed composite data and four multiplexed composite data, the rates are set to $2R_1$, $3R_1$ and $4R_1$, respectively.

A code addition unit 9 adds a synchronizing signal, a header, an error-correcting code and the like necessary for transmission to the multiplexed data, and transmits the resultant signal to a modulation unit 10. The modulation unit 10 modulates the carrier using the input data in accordance with the number of multiplexed data.

The bandwidth for the output of the modulation unit 10 is $k \cdot R_2$ which is equal to or less than a bandwidth W/4 allocated to one composite data. Similarly, the bandwidths for a plurality of multiplexed composite data are expressed as follows:

In the case of two multiplexed composite data:

$$(2/4) \times W \geq k \times (2R_2)$$

In the case of three multiplexed composite data:

$$(3/4) \times W \geq k \times (3R_2)$$

In the case of four multiplexed composite data:

$$W \geq k \times (4R_2),$$

where $R_2 = R_1 (1+m)$ k: a constant determined by a roll-off factor of a modulator m: redundancy such as a synchronizing signal, a header, an error-correcting code and the like (1<m).

The modulation unit 10 operates at the minimum transmission rate for one carrier, i.e., n (n=1, 2, 3, 4 in the first embodiment) times the data rate $R_2$ when transmitting one composite data.

Figure 4:
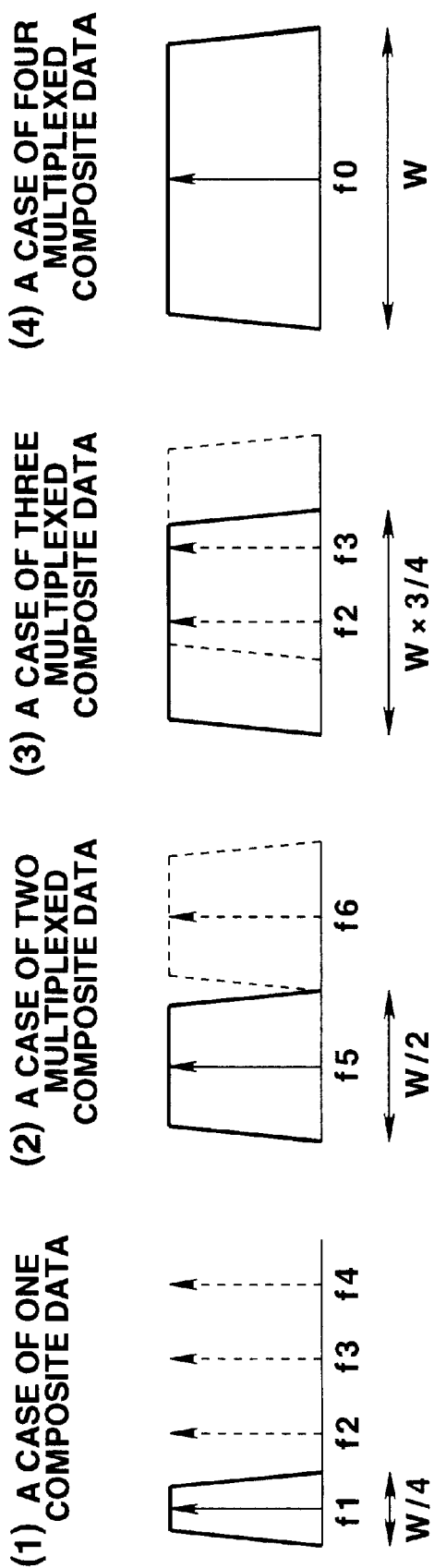
FIG. 4 is a diagram illustrating the arrangement of the frequencies of transmission signals in the first embodiment.

A frequency conversion unit 11 converts the modulated wave into a wave of an appropriate high frequency. The central frequencies of carriers in the first embodiment are arranged as shown in FIG. 4. The carrier input to the frequency conversion unit 11 is subjected to frequency conversion into one of f1, f2, f3 and f4, f5 or f6, and f2 or f3 when transmitting one composite data, when the number of multiplexed composite data is 2, and when the number of multiplexed composite data is 3, respectively. When the number of multiplexed composite data is 4, the central frequency is f0.

In the first embodiment, data for recognizing the number of multiplexed composite data is input from the multiplexing unit 8 to the frequency conversion unit 11.

The central frequency of the carrier is set to one of the positions obtained by equally dividing the predetermined transmission band W by 2L (L is the maximum number of transmittable carriers). In the first embodiment, since the maximum number of transmittable carriers is 4, the central frequency is set to one of the positions obtained by equally dividing the transmission band by 8.

In the first embodiment, the following relationships are present between f0–f6 and W:

f1=f0−(3/8)×W
f2=f0−(1/8)×W
f3=f0+(1/8)×W
f4=f0+(3/8)×W
f5=f0−(1/4)×W
f6=f0+(1/4)×W.

The carrier subjected to frequency conversion is subjected to power amplification by a high-frequency amplification unit 12, and is then radiated from an antenna 13.

Next, the first image-data encoding unit 41 will be described in detail.

Figure 5:
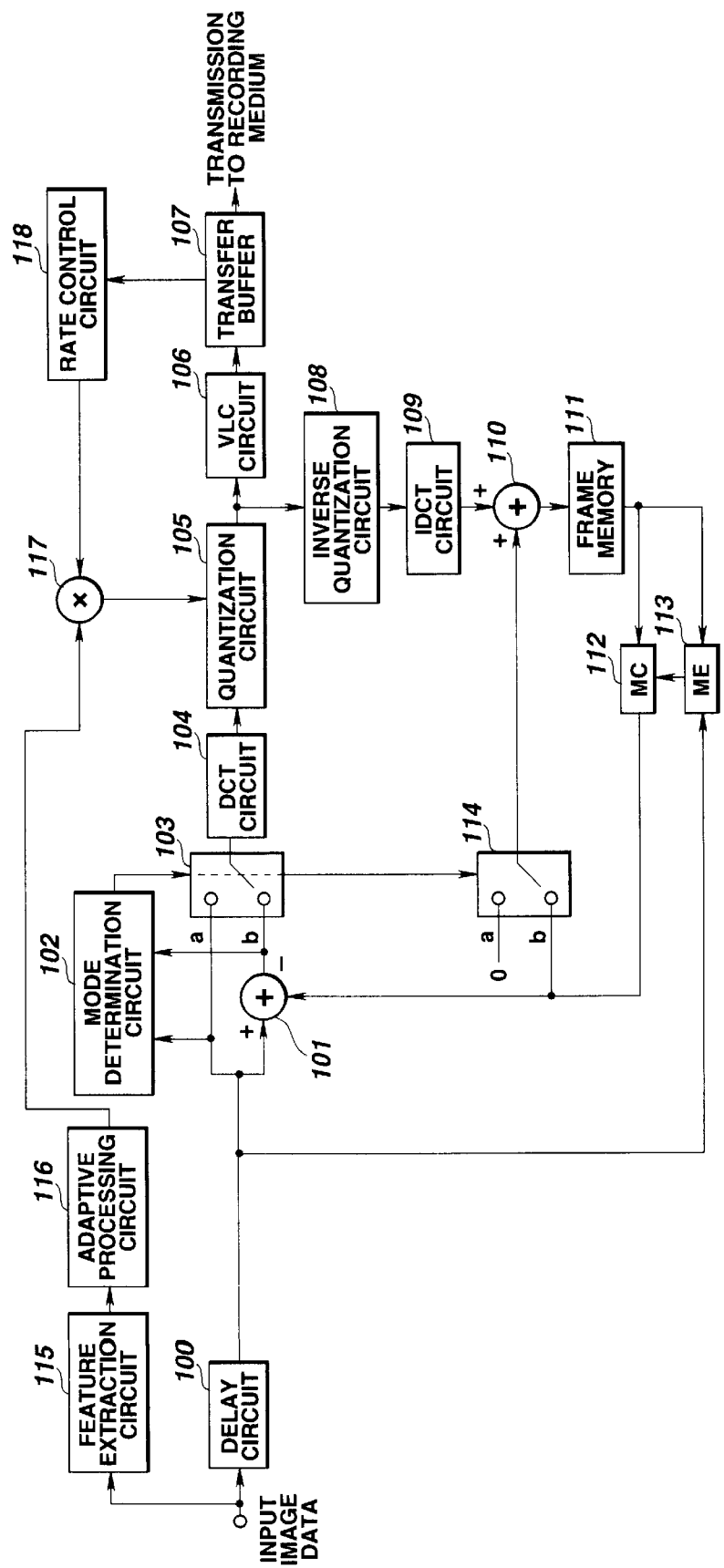
FIG. 5 is a block diagram illustrating the configuration of an image-data encoding unit shown in FIG. 3.

FIG. 5 is a detailed block diagram of the first image-data encoding unit 41. In FIG. 5, input image data is input in units of a block comprising 16×16 pixels. The input image data is input to a delay circuit 100 and a feature extraction circuit 115.

The feature extraction circuit 115 calculates the energy PWR of level variations of the input image data according to the following calculation formulas:

$$AVR = (1/256)\sum_{i=1}^{16}\sum_{j=1}^{16} O(i, j) \quad (1)$$

$$PWR = (1/256)\sum_{i=1}^{16}\sum_{j=1}^{16} [O(i, j) - AVR]^2, \quad (2)$$

where
AVR: the average level of the block
PWR: the energy of the block
O(i,j): input image data
i,j: the position of a pixel in the block (1–16).

According to the above-described calculation formulas, the value of PWR becomes larger for a block having larger level variations within the block. The calculated PWR is transmitted to an adaptive processing circuit 116.

The adaptive processing circuit 116 generates a quantization auxiliary parameter from the energy PWR of level variations calculated for each block according to two-step processing.

First-step processing

The energy PWR of level variations in each block is classified into one of class 0–class 3 according to formula (2). In formula (2), quantization values for an image comprise 8 bits. Values to be used in formula (2) are not limited to the values shown in this embodiment.

In the first embodiment, classification is performed as follows:

Class 3: when PWR/32>32
Class 2: when PWR/32>8

Class 1: when PWR/32>1
Class 0 for other cases.

Second-step processing

The above-described class numbers are given to the positions of respective blocks of input image data. When there is a block having a class number smaller than the class number of a target block from among the eight blocks, comprising four linearly adjacent blocks and four obliquely adjacent blocks, a number subtracted from the class number of that block is made to be a new class number for the block. However, if the obtained number becomes less than 0, 0 is set as a new class number. A coefficient to be multiplied on a quantization scale from a rate control circuit 118 (to be described later) is derived from the class number and is output as a quantization auxiliary parameter $Q_{sub}$.

For example, in the first embodiment, the following quantization parameters $Q_{sub}$ are output:

$Q_{sub}$=1.0 when class=0
$Q_{sub}$=1.2 when class=1
$Q_{sub}$=1.5 when class=2
$Q_{sub}$=1.8 when class=3.

FIGS. 6(a)–6(c) illustrate an example of data provided in processing performed by the adaptive processing circuit 116. FIGS. 6(a)–6(c) show the arrangement of blocks in a part of a frame. Bn in FIGS. 6(a)–6(c) represents a block.

For example, PWR is "1640" for the Bn block, and class "3" is derived in the first-step processing of the adaptive processing circuit 116 (see FIG. 6(b)). In the second-step processing, since a block having a smaller class than the class of the block Bn is present at the right of, below and obliquely below the Bn block, "1" is subtrated from "3", and its new class is made to be class "2" (see FIG. 4(c)).

The delay circuit 100 delays input image data by a predetermined time period. That is, the input image data is delayed by the same time period as the time period of the processing performed by the feature extraction unit 115 and the adaptive processing circuit 116, so that the image data reaches a quantization circuit 105 at the same timing as the above-described quantization auxiliary parameter.

The input image data delayed by the delay circuit 100 is input to a terminal "a" of a switch 103, a predicted-error calculation circuit 101 and a motion detection (ME) circuit 113. A predictive signal for the input image data is also input from a motion compensation (MC) circuit 112 to the predicted-error calculation circuit 101, and the difference from the input image is calculated.

The difference output of the predicted-error calculation circuit 101 is input to a terminal b of the switch 103. The switch 103 is controlled by the output of a mode determination circuit 102 to selectively output the input image data or the difference data, and the selected output is input to a DCT (discrete cosine transform) circuit 104.

The mode determination circuit 102 compares the input image data with the predicted-error data from the predicted-error calculation circuit 101 for each block (for example, by performing a comparison of the magnitudes of the energy component of level variations), and controls switches 103 and 114 based on the result of the comparison.

The DCT circuit 104 converts the image data into frequency coefficient data F[u][v] by dividing the image data into blocks of 8×8 pixels and performing DCT, and inputs the obtained data to the quantization circuit 105. In the first embodiment, v and u assume values 0–7.

The quantization circuit 105 performs, for example, quantization according to expression (3), and outputs quantization coefficient data QF[u][v].

$$QF[u][v]=16 \times F[u][v]/(W[v][u] \times \text{quantization scale}) \quad (3)$$

where W[v][u]: quantization matrix table quantization scale: scale value for performing quantization.

The quantization coefficients output from the quantization circuit 105 are input to a VLC (variable-length coding) circuit 106. The VLC circuit 106 reduces the amount of data using a Huffman coding method, and outputs the resultant data to a transmission buffer 107. The transmission buffer 107 reads the data at a predetermined encoding bit rate. The transmission buffer 107 also inputs the degree of occupation of the buffer to the rate control circuit 118.

The quantization coefficient data QF[v][u] is input to an inverse quantization circuit 108, which performs inverse quantization with characteristics inverse to those of the quantization circuit 105. The resultant data is input to an IDCT (inverse DCT) circuit 109 as decoding coefficient data. The IDCT circuit 109 performs inverse DCT, and the resultant data is input to an adder 110. The output of the switch 114 is also input to the adder 110. The adder 110 outputs decoded image data which is input to a frame memory 111.

"0" is input to a terminal "a" of the switch 114, and the predictive signal from the MC circuit 112 is input to a terminal b of the switch 114. The switch 114 is controlled by the output of the mode determination circuit 102 so as to be linked with the switch 103.

The frame memory 111 stores the decoded image data from the adder 110, and transmits the stored data to the MC circuit 112 and the ME circuit 113.

The ME circuit 113 performs motion detection using, for example, the sum of differences between the decoded image data from the frame memory 111 and input image data, and outputs a motion vector having a small sum of differences to the MC circuit 112.

The MC circuit 112 performs motion compensation using the motion vector, and transmits the obtained signal to the predicted-error calculation circuit 101 and the switch 114 as a predictive signal for the input image data.

The rate control circuit 118 appropriately updates the quantization scale for controlling the quantization circuit 105 in units of a block or in units of a plurality of blocks in accordance with the degree of occupation of the transfer buffer 107, and transmits the updated value to the quantization circuit 105. When the degree of occupation of the transfer buffer 107 is small, the quantization scale is changed to a small value in order to increase the amount of generated data by reducing the quantization step of the quantization circuit 105. When the degree of occupation of the transfer buffer 105 is large, the quantization scale is changed to a large value in order to increase the quantization step of the quantization circuit 105.

The quantization scale from the rate control circuit 118 and the quantizaion auxiliary parameters generated by the adaptive processing circuit 116 are input to a multiplier 117, which multiplies the input values. The result of the multiplication is input to the quantization circuit 105 as the final value for the quantization scale.

As described above, according to the first embodiment, by regularly arranging the central frequencies of carriers as shown in FIG. 4, the restriction in the selection of the transmission frequencies of other stations is minimized, and the band can be effectively utilized.

At the reception side, the original data is subjected to digital decoding after converting the frequency of the received wave. In order to deal with a plurality of transmission rates, a plurality of clock-signal regeneration circuits are required. In general, such a circuit comprises a synchronizing circuit using a so-called PLL (phase locked loop) circuit including a clock component extraction circuit and a voltage-controlled crystal oscillator (VCXO) using the oscillation frequency of the data transfer rate as the reference frequency. By providing the input rate for the modulation unit with regularity as described above, a 1/n rate can be dealt with by providing a VCXO having a reference frequency corresponding to the maximum rate $nR_2$ and a frequency division circuit.

Second Embodiment

In the first embodiment, the bandwidth allocated to one composite data is fixed. A second embodiment of the present invention, however, provides an image data transmission apparatus capable of changing the bandwidth in accordance with the setting of a required picture-quality mode.

Figure 7:
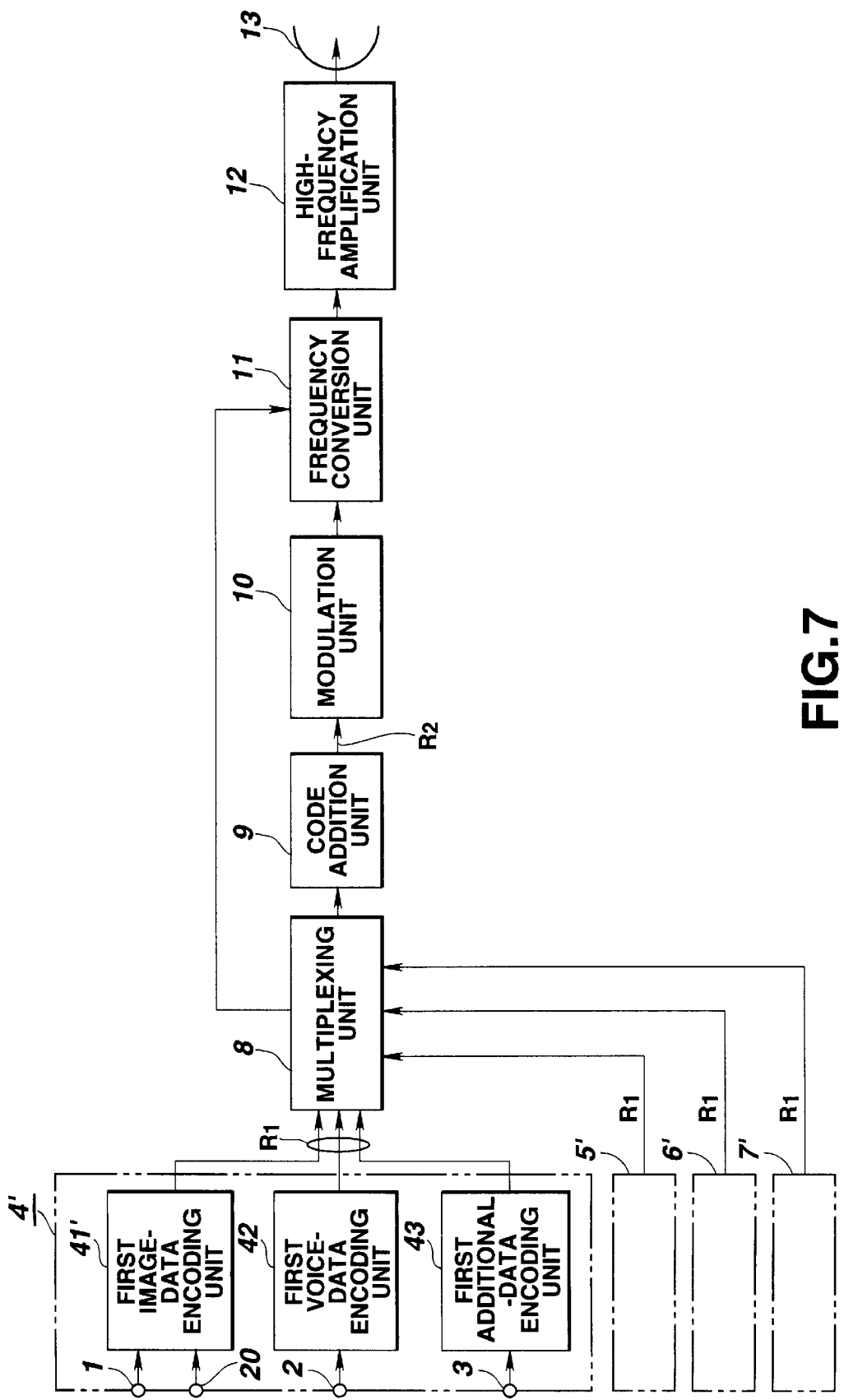
FIG. 7 is a block diagram illustrating the configuration of an image data transmission apparatus according to a second embodiment of the present invention.

FIG. 7 is a block diagram illustrating the image data transmission apparatus according to the second embodiment. In FIG. 7, the same components as those in the first embodiment are indicated by the same reference numerals, and a description thereof will be omitted.

In FIG. 7, a first image-data encoding unit 41' has a picture-quality-mode input terminal 20, and controls the compression ratio so that the output data rate of the composite data is within a range of 1/L–L times a standard data rate $R_1$ (to be described later), i.e., a data rate of $R_1/4$–$4R_1$, in accordance with a picture-quality-mode signal. A low-picture-quality mode is set when the data rate is smaller than $R_1$, and a high-picture-quality mode is set when the data rate is larger than $R_1$.

Although in the second embodiment, the compression ratio is controlled by inputting picture-quality-mode data from the outside, the compression ratio may be controlled by providing a picture-quality-mode setting unit within the composite data encoding unit.

For controlling the compression ratio, a picture-quality-mode signal may be input to the rate control circuit 118 of the image data encoding unit (see FIG. 3) in the first embodiment, and the rate control circuit 118 may set the quantization scale in consideration of the input picture-quality-mode signal.

Reference numerals 5', 6' and 7' represent first, third and fourth composite-data encoding units, respectively. Each of the units has the same internal configuration as a first composite-data encoding unit 4'.

Composite data compressed to a predetermined rate in each of the data encoding units is transmitted to a multiplexing unit 8. The multiplexing unit 8 performs multiplexing of encoded data from a plurality of image-data encoding units, voice-data encoding units and additional-data encoding units, and outputs the resultant signal. The output rate is determined by a predetermined maximum number L=4 of carriers within the band for a predetermined transmission band W. The output rate $R_1$ for multiplexed data which can be transmitted in a band of W/4 is determined as a standard data rate. The carrier is modulated by input data in accordance with a data rate which is $K_1$ ($1 \leq K_1 \leq L$) times the standard data rate, i.e., $R_1$, $2R_1$, $3R_1$ and $4R_1$. The occupied bandwidth at the output of the modulation unit 10 is as follows:

In the case of the data rate $R_1$ for one wave:

$$(1/4) \times W = k \times R_2$$

In the case of the data rate $2R_1$ for one wave:

$$(2/4) \times W = k \times 2 \times R_2$$

In the case of the data rate $3R_1$ for one wave:

$$(3/4) \times W = k \times 3R_2$$

In the case of the data rate $4R_1$ for one wave:

$$W = k \times 4 \times R_2,$$

where $R_2 = R_1(1+m)$ k: a constant determined by a roll-off factor of a modulator m: redundancy such as a synchronizing signal, a header, an error-correcting code and the like (m<1).

The modulation unit 10 operates at the minimum transmission rate for one carrier, i.e., n (n=1, 2, 3, 4) times the input rate $R_2$ for the modulating unit.

Figure 8:
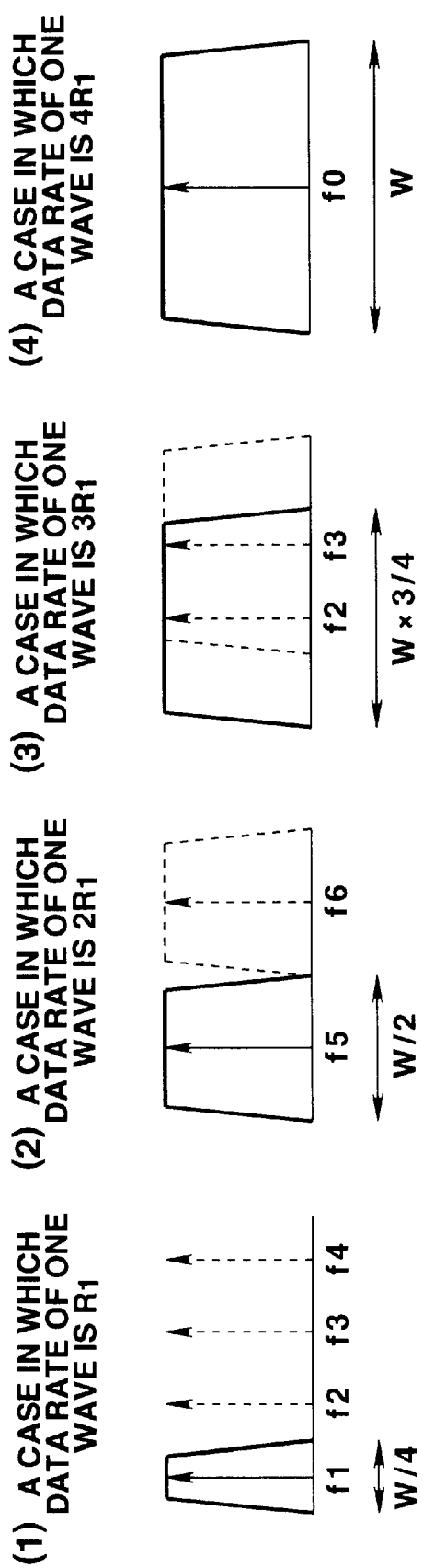
FIG. 8 is a diagram illustrating the arrangement of the frequencies of transmission signals in the second embodiment.

A frequency conversion unit 11 converts the modulated wave into a wave of an appropriate high frequency. The central frequencies of carriers are arranged as shown in FIG. 8. The carrier input to the frequency conversion unit 11 is subjected to frequency conversion into one of f1, f2, f3 and f4, f5 or f6, and f2 or f3 in the case of the data rates $R_1$, $2R_1$ and $3R_1$, respectively. In the case of the data rate $4R_1$, the central frequency is f0.

The central frequency of the carrier is set to one of the positions obtained by equally dividing the predetermined transmission band W by 8, i.e., twice the maximum number 4 of transmittable waves. The same relationship as described in the first embodiment holds between f0–f6 and W.

Specific examples of multiplexing in the second embodiment will now be described.

(1) When the data rate of a multiplexed output is the standard rate $R_1$

Four low-picture-quality composite data having a rate of $(1/4)R_1$, i.e., four images, are transmitted.

One composite data having a rate of $(1/2)R_1$ and two composite data having a rate of $1/4$ $R_1$, i.e., three images in total, are transmitted.

Two composite data having a rate of $(1/2)R_1$, i.e., two images, are transmitted.

One standard-picture-quality composite data having the rate $R_1$, i.e., one image, is transmitted.

As described above, the central frequency of the carrier at that time can be selected from f1, f2, f3 and f4.

(2) When the data rate of a multiplexed output is $2R_1$

Four low-picture-quality composite data having a rate of $(1/2)R_1$, i.e., four images, are transmitted.

one standard-picture-quality composite data having the rate $R_1$ and two composite data having a rate of $(1/2)R_1$, i.e., three images in total, are transmitted.

Two standard-picture-quality composite data having the rate $R_1$, i.e., two images, are transmitted.

One high-picture-quality composite data having a rate of $(3/2)R_1$ and one low-picture-quality composite data having a rate of $(1/2)R_1$, i.e., two images in total, are transmitted.

One high-picture-quality composite data having a rate of $2R_1$, i.e., one image, is transmitted.

As described above, the central frequency of the carrier at that time can be selected from f5 and f6.

(3) When the data rate of a multiplexed output is $3R_1$

Two standard-picture-quality composite data having the rate $R_1$ and two low-picture-quality composite data having a rate of $(1/2)R_1$, i.e., four images in total, are transmitted.

One high-picture-quality composite data having a rate of $(3/2)R_1$ and three low-picture-quality composite data having a rate of $(1/2)R_1$, i.e., four images in total, are transmitted.

One standard-picture-quality composite data having the rate $R_1$ and one high-picture-quality composite data having a rate of $(3/2)R_1$, i.e., three images in total, are transmitted.

Three composite data having the rate $R_1$, i.e., three images, are transmitted.

Two high-picture-quality composite data having a rate of $(3/2)R_1$, i.e., two images, are transmitted.

One high-picture-quality composite data having a rate of $2R_1$ and one standard-picture-quality composite data having the rate $R_1$, i.e., two images in total, are transmitted.

One high-picture-quality composite data having a rate of $3R_1$, i.e., one image, is transmitted.

As described above, the central frequency of the carrier at that time can be selected from f2 and f3.

(4) When the data rate of a multiplexed output is $4R_1$

Two high-picture-quality composite data having a rate of $(3/2)R_1$ and two low-picture-quality composite data having a rate of $(1/2)R_1$, i.e., four images in total, are transmitted.

Two standard-picture-quality composite data having the rate $R_1$, one low-picture-quality composite data having a rate of $(1/2)R_1$ and one high-picture-quality composite data having a rate of $(3/2)R_1$, i.e., four images in total, are transmitted.

Four standard-picture-quality composite data having the rate $R_1$, i.e., four images, are transmitted.

One high-picture-quality composite data having a rate of $2R_1$ and two standard-picture-quality composite data having the rate $R_1$, i.e., three images in total, are transmitted.

Two high-picture-quality composite data having a rate of $2R_1$, i.e., two images, are transmitted.

One high-picture-quality composite data having a rate of $4R_1$, i.e., one image, is transmitted.

As described above, the central frequency of the carrier at that time is f0.

By thus providing the multiplexing unit 8 capable of performing multiplexing of a plurality of outputs of composite-data encoding units including an image-data encoding unit having a plurality of picture quality modes, a predetermined transmission band can be effectively utilized.

As described above, according to the present invention, by regularly arranging the central frequencies of carriers as shown in FIG. 6, it is possible to minimize restriction given to the selection of the transmission frequencies of other stations, to determine appropriate picture quality in accordance with the use of transmission by combining a plurality of picture-quality modes, and to effectively utilize a band.

Since the reception side has the same configuration as that described in the first embodiment, a description thereof will be omitted.

As described above, according to the foregoing embodiments, since the central frequencies of carriers are set in accordance with the number of multiplexed data, it is possible to effectively utilize a band, to minimize restriction given to the selection of the transmission frequencies of other stations, and therefore to facilitate the utilization of a band by a plurality of stations.

It is also possible to transmit a plurality of programs having different picture quality levels by a single carrier to facilitate the provision of diverse programs, and to delete hardware for transmitting a plurality of carriers.

Since regularity is provided for the input rate for a modulation unit, it is possible to reduce hardware components in a transmission clock signal regeneration circuit of a demodulation circuit at the reception side.

Since quantization parameters when decoding image data are determined by determining the feature of image data for each block obtained by dividing the image data by taking into consideration of the features of adjacent blocks, it is possible to reproduce excellent image quality.

The individual components designated by blocks in the drawings are all well known in the information data processing apparatus/method and encoding apparatus/method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information data processing apparatus comprising:
   input means for inputting a plurality of information data;
   multiplexing means for multiplexing a number of the plurality of information data input by said input means to provide multiplexed information data;
   modulation means for performing digital modulation of a carrier using the multiplexed information data; and
   setting means for setting a central frequency of the carrier in accordance with the number of the information data multiplexed by said multiplexing means.

2. An apparatus according to claim 1, wherein the information data comprises image data, and wherein said input means comprises encoding means for performing compression encoding of the image data.

3. An apparatus according to claim 2, wherein said encoding means comprises block forming means for dividing the image data into blocks, extraction means for extracting a feature of an image for each of the blocks, and quantization means for quantizing the image data for each of the blocks in accordance with an output of said extraction means.

4. An apparatus according to claim 3, wherein said extraction means determines a quantization parameter of said quantization means for a target block using features of others of the blocks adjacent to the target block.

5. An apparatus according to claim 1, wherein said encoding means comprises transformation means for performing an orthogonal transformation of the image data.

6. An apparatus according to claim 5, wherein said modulation means performs digital modulation of the multiplexed information data within a predetermined band W, and wherein the central frequency of the carrier is set to one of at least one position obtained by dividing the predetermined band W by 2L, L being a maximum number of carriers within the band.

7. An information data processing apparatus for performing digital transmission of a plurality of encoded image data within a predetermined transmission band W, said apparatus comprising:
   a plurality of encoding means for encoding a plurality of image data to provide a plurality of encoded image data;
   multiplexing means for multiplexing the plurality of encoded image data and outputting multiplexed data, the multiplexed data being data having a bit rate equal to K ($1 \leq K \leq L$: integer) times a bit rate R of multiplexed data which can be transmitted within a band W/L determined by a predetermined maximum number L of carriers within the predetermined transmission band; and
   modulation means for performing digital modulation of one of the carriers using the multiplexed data, an output rate of said encoding means being able to be set within a range of 1/L–L times the bit rate R.

8. An apparatus according to claim 7, further comprising frequency conversion means for setting a central frequency of the one carrier in accordance with the value K.

9. An apparatus according to claim 7, wherein said modulation means operates at a rate equal to K times a minimum transmission rate per wave.

10. An apparatus according to claim 7, wherein said encoding means comprises block forming means for dividing the image data into blocks, extraction means for extracting a feature of an image for each of the blocks, and quantization means for quantizing the image data for each of the blocks in accordance with an output of said extraction means.

11. An apparatus according to claim 10, wherein said extraction means determines a quantization parameter of said quantization means for a target block using features of others of the blocks adjacent to the target block.

12. An encoding apparatus comprising:
   input means for inputting image data;
   block forming means for dividing the image data into blocks;
   extraction means for extracting a feature of image data for each of the blocks formed by said block forming means, wherein said extraction means detects the energy of the block which indicates level variations within the block;
   quantization means for quantizing image data of a target one of said blocks in accordance with a result of extraction of said extraction means; and
   encoding means for encoding the image data quantized by said quantization means.

13. An encoding apparatus comprising:
   input means for inputting image data;
   block forming means for dividing the image data into blocks;
   extraction means for extracting a feature of image data for each of the blocks formed by said block forming means;
   quantization means for quantizing image data of a target block;
   encoding means for encoding the image data quantized by said quantization means; and
   storage means for temporarily storing the encoded image data,
   wherein said quantization means quantizes the image data of the target block in accordance with a result of extraction of said extraction means, others of the blocks adjacent to the target block and a degree of occupation of said storage means.

14. An information data processing method comprising the steps of:

inputting a plurality of information data;

multiplexing a number of the plurality of input information data to provide multiplexed information data;

performing digital modulation of a carrier using the multiplexed information data; and setting a central frequency of the carrier in accordance with the number of the information data multiplexed in said multiplexing step.

15. An encoding method comprising the steps of:

inputting image data;

dividing the image data into blocks;

extracting a feature of image data for each of the blocks, wherein said extraction step detects the energy of the block which indicates level variations within the block;

quantizing image data of a target block in accordance with a result of extraction in said extraction step; and encoding the image data quantized in said quantization step.

16. An encoding method comprising the steps of:

inputting image data;

dividing the input image data into blocks;

extracting a feature of image data for each of said blocks;

quantizing image data of a target one of said blocks;

encoding the image data quantized in said quantization step; and temporarily storing the encoded image data on a storage medium, wherein said quantization step quantizes the image data of the target block in accordance with a result of extraction in said extraction step, others of the blocks adjacent to the target block and a degree of occupation of said storage medium.

17. An information data processing method for performing digital transmission of a plurality of encoded image data within a predetermined transmission band W, said method comprising the steps of:

encoding a plurality of image data in plural encoding means to provide a plurality of encoded image data;

multiplexing the plurality of encoded image data and outputting multiplexed data, the multiplexed data being data having a bit rate equal to K ($1 \leq K \leq L$: integer) times a bit rate R of multiplexed data which can be transmitted within a band W/L determined by a predetermined maximum number L of carriers within the predetermined transmission band; and performing digital modulation of one of the carriers using the multiplexed data, an output rate of said encoding means being able to be set within a range of 1/L–L times the bit rate R.

* * * * *

UNITED STATES PATENT AND TRADEMARK OFFICE
CERTIFICATE OF CORRECTION

PATENT NO.    : 6,097,737

DATED         : August 1, 2000

INVENTOR(S)   : HIROSHI TAKIZAWA ET AL

It is certified that error appears in the above-identified patent and that said Letters Patent is hereby corrected as shown below:

COLUMN 12:

Line 44, "one of said blocks" should read
        --block--.

COLUMN 13:

Line 27, "one of said blocks;" should read
        --block;--.

Signed and Sealed this

Twenty-fourth Day of April, 2001

Attest:

NICHOLAS P. GODICI

*Attesting Officer*    *Acting Director of the United States Patent and Trademark Office*